Oct. 31, 1944.   T. M. FERRILL, JR   2,361,390
STEREO INDICATOR
Filed Nov. 1, 1943   2 Sheets-Sheet 1
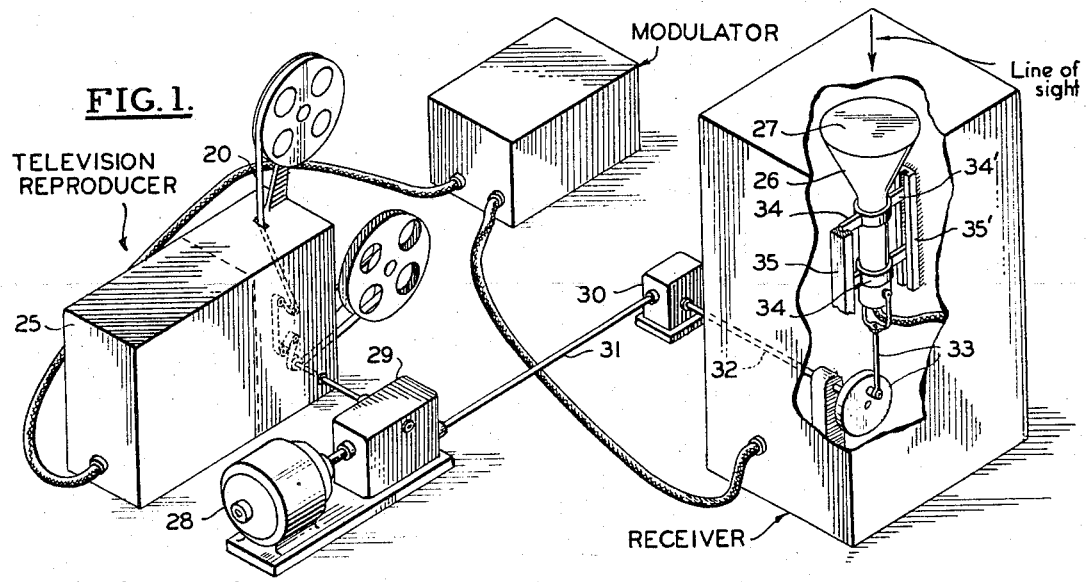
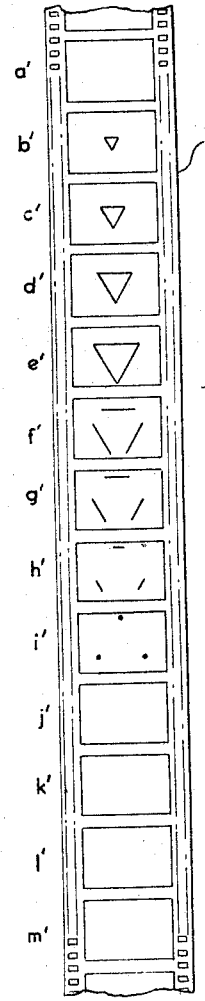
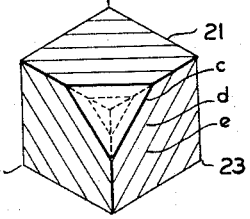
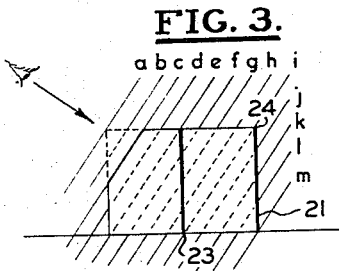
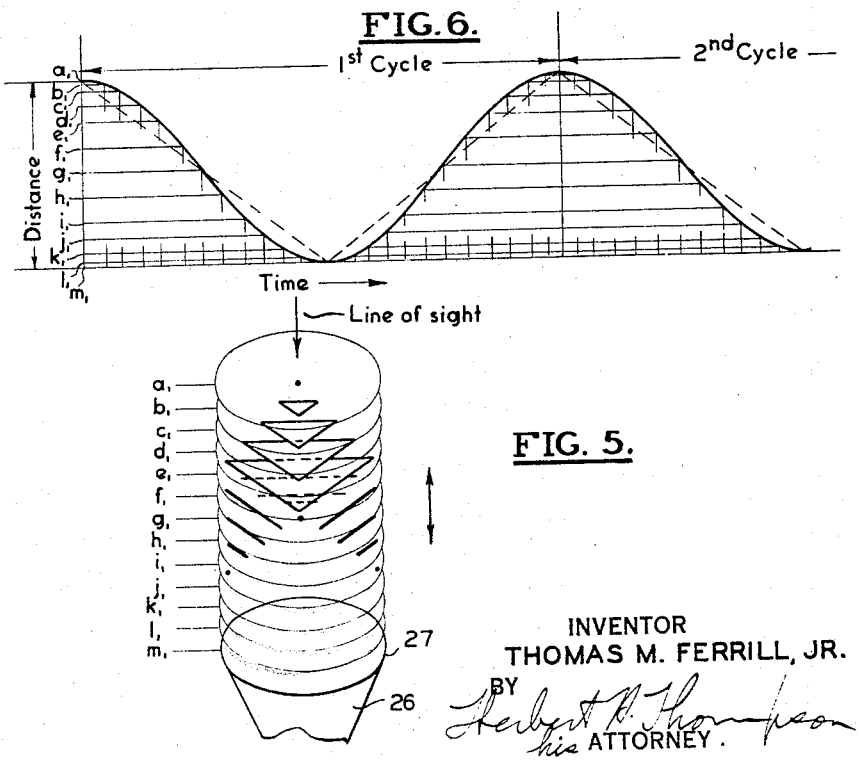
INVENTOR
THOMAS M. FERRILL, JR.
BY
his ATTORNEY.

Oct. 31, 1944.　　T. M. FERRILL, JR　　2,361,390
STEREO INDICATOR
Filed Nov. 1, 1943　　2 Sheets-Sheet 2

INVENTOR
THOMAS M. FERRILL, JR.
BY Herbert W Thompson
his ATTORNEY.

Patented Oct. 31, 1944

2,361,390

UNITED STATES PATENT OFFICE 2,361,390

STEREO INDICATOR

Thomas M. Ferrill, Jr., Hempstead, N. Y., assignor to Sperry Gyroscope Company, Inc., a corporation of New York Application November 1, 1943, Serial No. 508,615

19 Claims. (Cl. 178—6.5)

This invention relates to the art of image formation with particular reference to methods and apparatus for producing images of objects, variously located in space, upon light or electron-sensitive surfaces in such manner that the images formed will be three dimensional or stereographic representations of the object or objects standing or moving within the field of vision. The images of distant objects formed by the use of this invention will provide an indication of the distances between objects coming within the field of vision and will show the location of each object relative to the locations of the other objects within the space being scanned. In the case of a larger object located closer to the surveying station, a three dimensional image thereof will be presented to the eye of the observer which will indicate the relative proportions of the object, in length, breadth, and height, as well as indicating which of one or more distance objects is the nearer to the object close at hand.

The invention has special utility in the training of airport traffic directors as it permits the reproduction in the training room of exact replicas of actual situations which had arisen in the landing and taking off of aircraft at the airport, and in the operation of aircraft in the vicinity of the airport.

The three dimensional reproduction of the various objects indicating their orientation relative to each other and relative to the control station, made possible by the use of this invention, would also be of real value in working out the solution of airport traffic control problems and in determining the most effective methods of preventing collisions between incoming and outgoing aeroplanes under conditions of low visibility or of zero ceiling. The invention makes it possible to produce three dimensional representations of either moving or stationary objects and many uses for such three-dimensional representations can be readily perceived.

It has been customary in the past to reproduce the images of objects being scanned upon stationary surfaces or screens with the result that such representations have been only two dimensional representations, lacking any indication of relative size and distance in the third plane of motion or measurement. The present invention fulfills this need for indications in the third spatial plane or direction, indications which must be provided if information relative to the space between approaching or receding objects is to be made available to operators at traffic control stations and other similar locations.

In the conventional stereoscopic viewer now in use the observer is restricted to one line of sight. In the present invention the observer is allowed considerable latitude in the choice of a line of sight. Although optimum results are obtained by making the observations from a position directly above the screen upon which the images are formed, entirely satisfactory results are obtained when observations are made obliquely from a position to one or the other side of this perpendicular line of sight as long as the deviations from the perpendicular line of sight are not extreme. Thus observations by more than one observer may be simultaneously obtained.

Although the system herein described is disclosed as a system for moving a cathode ray tube screen relative to the position of an observer it will be apparent that the principles of the invention are susceptible to a wide variety of applications. Because of the large number of patentably equivalent systems which may be devised, the present disclosure omits all details or specific structural features which are not necessary to the formation of a complete understanding of the principles inherent in the present invention.

One of the major objects of this invention is to provide a method of presenting range data or indications of the orientation of objects within the field of view or region of supervision of an observer, at the traffic control point at an airport, for example, or other similar location, so that it may be readily determined whether objects within the region of supervision are above or below, to the right or left, or in front or behind one another, and in particular whether such objects, aircraft for example, are moving toward or away from one another at any particular time.

Another object of the invention is to produce three dimensional or perspective images of viewed objects or scenes so that the relative size and location of various features or parts of such objects may be readily observed.

A still further object of the invention is to make the cartoon type of motion picture more realistic by providing a method for creating three dimensional images of the various characters before the eyes of the audience.

Other objects and uses for the invention will be revealed by the specification, in conjunction with the accompanying drawings wherein several representative embodiments thereof are illustrated and described.

In the drawings,

Fig. 1 is a perspective view of typical apparatus making use of the principles of this invention.

Fig. 2 is an oblique view of a cubical object or block chosen for the reproduction to illustrate the manner in which the invention operates.

Fig. 3 is a view in oblique side elevation of the cubical block of Figure 2 showing a series of planes, labelled from a to m, passing obliquely through the block at equal intervals and at right angles to the line of sight.

Fig. 4 is an elevational view of a film strip or other recording medium the various frames of which contain a record of the outlines formed by the intersections of oblique planes a to m with the block shown in Figures 2 and 3.

Fig. 5 is a diagrammatic view illustrating the formation of an image of the block of Figure 2 as it is produced in space by the oscillation of the cathode ray tube depicted in Fig. 1, the degree of oscillation being shown greatly exaggerated to clarify the disclosure.

Fig. 6 is a time-space graph indicating one possible motion of the cathode ray tube screen and showing by the use of similar reference letters a', a₁, b', b₁, etc., the synchronization of the motions of the cathode ray tube screen and the film strip.

In Figs. 2, 3, 4, and 5 intersecting planes a to m are shown as equally spaced planes. These planes have been shown as equally spaced planes in conformity with the dotted line curve representative of linear motion in Fig. 6 for ease of illustration and explanation only. Satisfactory operation of the invention does not require the intersecting planes to be equally spaced or equally timed. With harmonic motion the images formed are of course much closer together at the extremes of the screen travel path than they are in the central portions of such path. The slight departure from strict linearity which arises when the motion of the screen is made harmonic in conformity with the solid line curve of Fig. 6 is readily compensated for by adjusting the spacing of the frames on film strip 20 to properly correspond to the actual positioning of the cathode ray screen as it follows the sine wave curve of harmonic motion shown in Fig. 6.

Figure 7A:
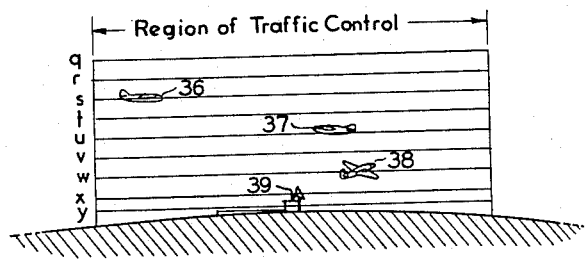

Fig. 7A is an elevational view of a typical airport indicating the region in which incoming and outgoing aircraft are subject to the immediate control of the ground station.

Figure 7C:
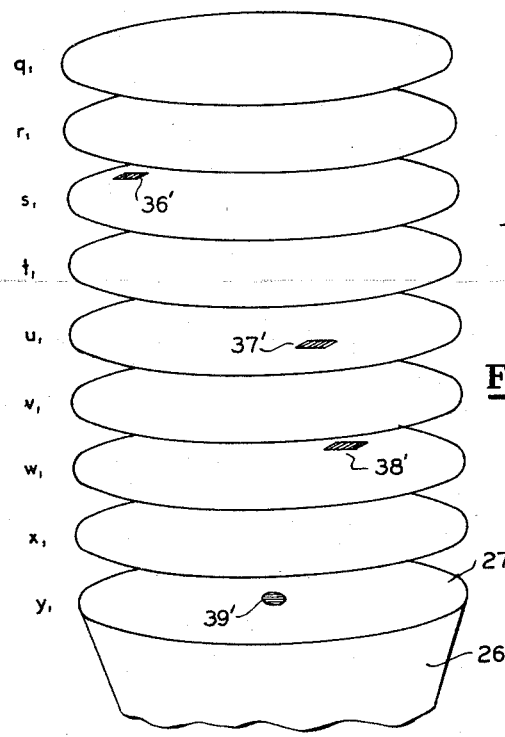
Figure 7B:
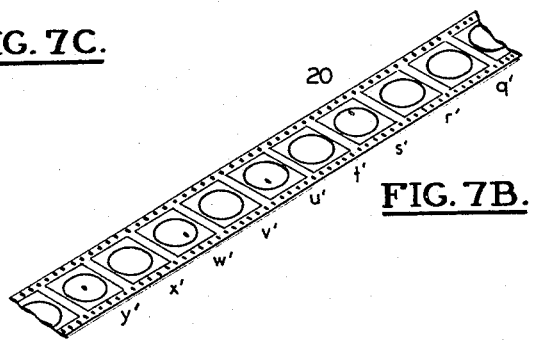

Fig. 7B is a perspective view of a film strip containing positional data of objects within the region of control.

Fig. 7C is a diagrammatic view illustrating the formation of images of the aircraft shown in Fig. 7A as produced by the oscillation of the cathode ray tube screen, the amplitude of the oscillations being shown on an exaggerated scale to aid in clarifying the disclosure.

Figs. 7A, 7B and 7C illustrate the application of the invention to a typical airport traffic control problem involving the movements of three aeroplane in the vicinity of the control tower.

Figure 8:
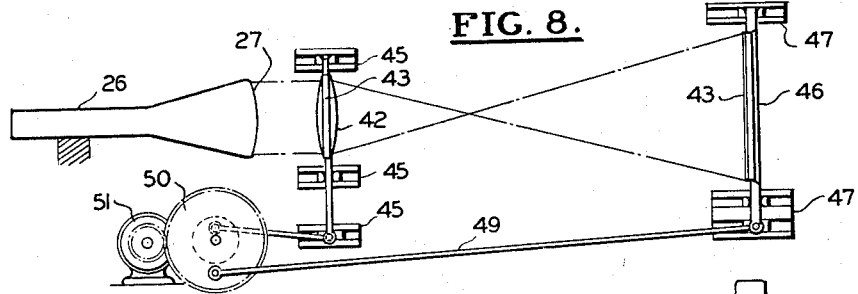

Fig. 8 is a side elevational view illustrating a modification of the invention in which a lens and its projection screen are moved rather than the cathode ray tube itself.

Figure 9:
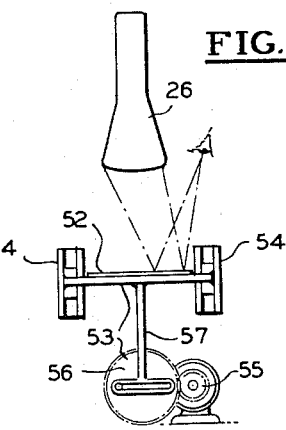

Fig. 9 is a side elevational view showing a still further modification calling for the oscillation of a mirror in front of a stationary cathode ray tube screen.

Figure 10:
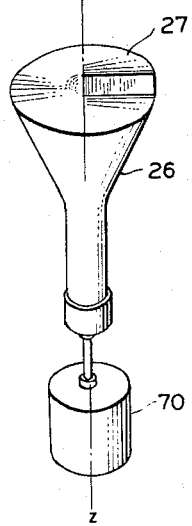

Fig. 10 is a perspective view showing a cathode ray tube having an end wall, similar in form to the shape of the thread portion of an Archimede's screw, the tube being revolved about its longitudinal axis as images are formed upon its spiral shaped end wall screen.

Figure 11:
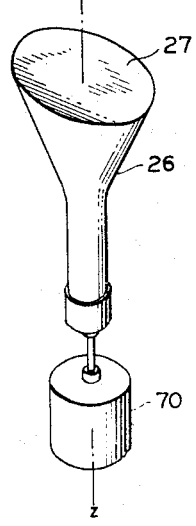

Fig. 11 is a perspective view showing another embodiment of the invention calling for the revolution of a cathode ray tube about its longitudinal axis, the tube being provided with a screen or end wall which is not at right angles to its longitudinal axis.

The invention has been disclosed as a system in which the visual information which it is desired to reproduce has already been impressed upon a suitable recording medium such as a film strip, or the like, for example, which may use the well known animated cartoon-depicting technique employed in the production of comic pictures by the motion picture industry. However, it should not be concluded from the use of this cartoon-drawing technique in the teaching of the invention, that the invention is confined to any such narrow field of usefulness, as other uses will be readily apparent from a reading of this specification.

Referring now to Figs. 1 to 6, which illustrate a relatively simple embodiment of the invention, there is shown a record such as a film strip 20 upon the various frames of which there have been formed in proper sequence and position, delineations of the forwardly facing areas of an observed object such as cubical block 21 as such outlines exist at the imaginary intersecting planes a, b, c, d, e, f, g, h, i, j, k, l and m shown passing obliquely through cubical block 21 of Figures 2 and 3. For example in Fig. 4, frame a' of film strip 20 shows a dot as the representation of the intersection of plane a of Fig. 3 with the block 21, frame b' shows a small triangle representing the intersection of plane b with block 21, frame c' shows a larger triangle as the outline existing at the intersection of plane c with block 21, frame d' shows the still larger triangle existing where plane d intersects block 21, and so on down the various frames of film strip 20 until frame i' is reached, where three equi-spaced dots representing corners 22, 23 and 24 of block 21 are shown. Beyond plane i the intersections of planes j, k, l and m are entirely behind the three front faces of block 21 and are therefore invisible to an observer looking down the selected line of sight. Frames j', k', l', and m' on film strip 20 which are positioned for the reception of the outlines formed by the intersection of planes j, k, l and m with cubical block 21 are therefore blank as shown in Fig. 4.

In Fig. 1 there is shown a conventional television reproducer 25 wherein the range and orientation data or information contained on film strip 20 is televised, electrically transmitted to, and reproduced upon an oscillating electron sensitive or fluorescent screen 27 of cathode ray tube 26. Television reproducer 25 includes an iconoscope, a scanning circuit and signal amplifiers and it delivers sweep synchronization signals and video signals corresponding to the variations of light intensity over incremental areas of the picture.

Modulator (not numbered) is a device such as is normally connected to a radio-frequency television transmitter for modulation of the output of the transmitter in accordance with the video signals and the synchronization signals. Connection to a radio-frequency transmitter is not shown.

Receiver (not numbered) is similar to the monitoring receiver usually employed in a television studio for continuous observation if the signal supplied by the video and synchronization modulator to the television radio frequency transmitter. In such a monitor the cathode ray tube is normally maintained stationary.

The following modifications are necessary to adapt the above described television system to the purposes and uses of the present invention.

A motor drive must be provided for oscillating cathode ray tube 26 in synchronism with the film drive of reproducer 25.

A cartoon-generated film 20 for producing planar views corresponding to the various positions of cathode ray screen 27 must be substituted for the usual type of movie film.

The speed of the film used in reproducer 25 must be increased some tenfold, more or less, above the normal frame speed used in such instruments, the scanning speed of the device being increased proportionately.

To permit these modifications to the usual mode of operation of the television system the sharpness of picture definition which is normally proportional to the number of lines scanned per frame may be reduced to some extent. Reeling mechanism of television reproducer 25 is driven by motor 28, and gearing contained in gear box 29. Connecting shaft 31, gear box 30, shaft 32, and crank and connecting rod mechanism 33 impart the necessary reciprocating motion to the screen, shown at the end of a cathode ray tube 26 which is mounted in collars provided with arms 34 and 34' free to move up and down in slides 35 and 35'. The reciprocating motion of cathode ray tube 26 is thus synchronized with the motion of film strip 20 as it is reeled through the television reproducer. Cathode ray tube screen 27 is oscillated at a persistence of vision rate, that is, at a rate above 15 cycles per second and the distance through which screen 27 is moved is in the order of 1 inch between the extremes of its travel, although neither the rate nor the distance of travel is critical.

The synchronization of the position of cathode ray tube screen 27 with the proper frame of film strip 20 will be clarified by a careful consideration of Figs. 3, 4, 5 and 6 wherein similar reference letters indicate corresponding positions of film strip 20 and cathode ray tube screen 27. For example, when the intersecting plane is at position $b$ of Figure 3 the corresponding frame $b'$ of film strip 20 in Figure 4 with its properly proportioned triangular image is before the lens of the television reproducer and the cathode ray tube screen 27 is in the position indicated by reference letter $b_1$ of Figure 5, the triangular image formed by the intersection of plane $b$ with block 21 being momentarily reproduced by electronic means upon the cathode ray tube screen while in this position. Thus as the motion cycles of film strip 20 and cathode ray tube screen 27 progress, plane $c$ of Fig. 3, frame $c'$ of Fig. 4 and cathode ray tube screen position $c_1$ of Fig. 5 occur simultaneously, positioned as shown, thus momentarily reproducing upon the cathode ray tube screen by electronic means the somewhat larger triangular image formed by the intersection of plane $c$ with block 21. Plane $c$ is followed by planes $d$, $e$, $f$, $g$, $h$, $i$, $j$, $k$, $l$ and $m$ in order with the cathode ray tube screen assuming a properly synchronized position in each instance until all steps of the cycle from plane $a$ to plane $m$ and back to plane $a$ again have been completed, thus progressively reproducing plane by plane, or step by step, an outline image in perspective of block 21 in the volume swept through by the cathode ray tube screen 27 as illustrated on an expanded scale by Fig. 5 of the drawings.

In Fig. 6 reference letter $a_1$ indicates the initial position of the cathode ray tube screen at the start of each cycle of its oscillatory motion, while the horizontal lines of Fig. 6 identified as $b_1$, $c_1$, etc., denote the successive positions of the screen occurring during equal time intervals following the start of each cycle. If block 21 is in motion rather than being stationary this fact will be recorded on film strip 20 of Fig. 4 by a displacement of the image on each of the various frames in the direction of the motion. For example, with block 21 in its present position the intersection of plane $c$ with block 21 forms a small triangle shown recorded on frame $c'$ of film strip 20 with the center of the triangle and the center of frame $c'$ coinciding. This triangle is reproduced on the cathode ray tube screen when the screen is at position $c_1$ of Fig. 5 corresponding to $c_1$ of the first cycle in Fig. 6. If now block 21 moves directly to the right then the triangle formed on plane $c$ and reproduced on the corresponding frame $c'$ of film strip 20 will have its center displaced to the right of the center of the frame and when reproduced on the cathode ray tube screen in position $c_1$ of the second cycle the triangle will also be displaced to the right relative to the location which it had on the cathode ray tube screen when this screen was in position $c_1$ of the first cycle. With block 21 continuing to move to the right the images of this triangular section will continue moving to the right as the screen reaches corresponding positions in successive cycles.

Thus the invention will show not only the dimensions of an object in length, breadth, and height but it will also disclose any motion of the object and the direction of such motion.

Each of the various objects to be portrayed may have some particular line of observation which presents its perspective features to the best advantage and when possible this optimum line of sight should be used in scanning the object.

The application of the invention as a means for presenting traffic control situations which may arise in the vicinity of an airport is illustrated in Figures 7A, 7B and 7C.

Fig. 7A presents an illustration of a typical operating condition at an airport showing three aeroplanes located in different elevation planes, $s$, $u$, and $w$ and at different distances from the control tower. The information defining the range and direction of the various objects or aeroplanes may be incorporated on a suitable recording medium such as photographic film strip 20 or the like as shown in Fig. 7B in any convenient and appropriate manner. If the information is manually recorded in accordance with the animated cartoon picture drawing technique, hypothetical as well as actual airport traffic control problems can be presented for analysis. Film strip 20 is run through television reproducer 25 and the images are reproduced on the oscillating cathode ray tube and the images are reproduced on the oscillating cathode ray tube screen 27, properly timed and spaced, in the same manner in which the various sections of block 21 were reproduced as shown in Figure 5. A three dimensional reproduction of the area surrounding the airport tower 39 thus is created in the volume swept through by the cathode ray tube screen as illustrated in Figure 7C. This figure shows dot-like representations 36', 37' and 38' of aeroplanes 36, 37 and 38 and their orientation relative to each other and to the control tower 39 as these aeroplanes move through the traffic control area. It will be noted that there are no objects at elevations corresponding to planes $q$, $r$, $t$, $v$ and $x$ of Figure 7A and hence no representations on frames $q'$, $r'$, $t'$, $v'$ and $x'$ of film strip 20 in Figure 7B and no images in space when the cathode ray tube screen is in positions $q_1$, $r_1$, $t_1$, $v_1$, and $x_1$, of Figure 7C.

Fig. 8 discloses a modified version of the present invention in which the cathode ray tube 26 and its screen 27 are maintained stationary, the images created upon screen 27 being projected upon a second screen 43 by a lens 42. Lens 42 is attached to a supporting frame 44 which is free to slide backward and forward in guides 45. Projection screen 43 is attached to supporting frame 46 which is likewise free to slide backward and forward in guides 47. By means of connecting rods 48 and 49, rotating crank-arm plate 50 and motor 51, lens 42 and projection screen 46 are oscillated backward and forward but in opposite directions in front of cathode ray tube screen 27, the movement of lens 42 and projection screen 46 being such as to keep screen 46 and lens 42 always in the proper focal relationship.

Figure 9 discloses another modification of the present invention wherein the cathode ray tube 26 and its screen 27 are stationary, the required oscillating element being provided in the form of a mirror 52 attached to a cross arm 53 sliding in supporting guides 54, with motor 55 oscillating mirror 52 in front of cathode ray tube screen 27 by means of crank-arm plate 56 and connecting rod 57. For the best results mirror 52 should be observed along an oblique line of sight, as shown, but without departing too far from the perpendicular. In practice the mirror may be oscillated back and forth through a distance approximating 1 inch. This version of the invention has the advantage that the images formed before the observer's eye appear to have twice the depth of the images which are formed by a similar movement of the cathode ray tube screen itself since the apparent motion of the cathode ray tube screen is twice the actual motion of the mirror 52.

Fig. 10 shows a modified version of the invention wherein a cathode ray tube 26 having an end wall 27 similar in form to the shape of the thread portion of an Archimedes screw is revolved about its longitudinal axis $z$—$z$ by motor 70 thus providing a means for sweeping the cathode ray tube screen 27 through a volume, as seen by an observer.

Fig. 11 illustrates a modified version of this invention in which a cathode ray tube 26 having an inclined or sloping screen wall 27 is similarly revolved about $z$—$z$ the longitudinal axis of the tube. In this version of the invention the plane of the end wall should not depart too far from a perpendicular to axis $z$—$z$ else the images formed in the central portions will be unduly distorted. In this version as in the version of Fig. 10 and the earlier version of Figs. 1–5 the observer should be stationed slightly above the moving cathode ray tube screen. This version as well as the version illustrated by Fig. 10, provides a means for sweeping the cathode ray tube screen through a volume in the region being viewed by an observer or operator.

The word object as used in the description and claims of this specification designates the entire field of view within the operating range of the system and is intended to comprehend either a single large body or any number of separate smaller bodies; conversely the word objects may connote either portions of one body or all bodies within the field of view.

While the invention is shown herein as a system in which the objects are analyzed by passing planes through them which are at right angles to the line of sight and parallel to one another, the invention could as well determine the various outlines of the objects from their intersections with spherical surfaces disposed at progressively increasing distances from an observer in a manner similar to the principle followed in a radar system, for example.

While in the embodiments of the invention disclosed in this specification the oscillatory motion of the surface upon which the images are formed is provided by electrically driven means this motion may if preferred be provided by mechanically, by manually or by hydraulically driven means.

Since many changes could be made in the above described constructions and many widely different embodiments of this invention could be made without materially departing from the spirit or scope of this invention, all matter contained in the above description or shown in the accompanying drawings should be broadly interpreted as illustrative and not as limiting or restrictive.

What is claimed is:

1. Visual position indicating apparatus for forming three dimensional images of objects located at progressively greater distances from a surveying station comprising means for providing the positional data of said objects, an electron-sensitive screen, means for impressing upon said electron-sensitive screen images of said objects located in accordance with said positional data, oscillating means for moving said electron-sensitive screen backward and forward relative to the location of an observer at a rate sufficient to form persisting images within the volume swept through by said electron-sensitive screen.

2. Visual image forming apparatus comprising means for forming upon an image-receptive surface separate representations of objects scattered in space, when said surface is located at distances from an observer commensurate with the simultaneous distances of said objects from a viewing station, and means for moving said image-receptive surface in reference to the position of an observer at a rate sufficient to create in the region traversed by said image-receptive surface a composite three dimensional representation of said objects which will indicate their relative locations in space.

3. In a system for forming an image in relief of an object and locating said image relative to the eye of an observer, the method comprising forming an image of successive portions of said object upon a fluorescent surface, reciprocating said fluorescent surface at a rate sufficient to produce sustained images of said successive portions upon the retina of said observer's eye, and correlating the instantaneous distances of said surface from the eye of said observer with the then existing distance between said successive portions of said object and a reference point.

4. In a system for forming images of various objects and locating said images relative to an observing station, the method comprising translating an electron-sensitive surface toward and away from the eye of an observer, and forming an image of each of said objects on said electron-sensitive surface at the precise moment that said electron-sensitive surface is at a distance from the eye of the observer correlated with the distance of the particular object from a reference point.

5. In a system for forming an image of a remote object and locating said image relative to an observer, the method comprising varying the effective distance between a viewing screen and the eye of an observer, and forming images of said remote object upon said viewing screen at moments when it is located at instantaneous distances from the eye of an observer consistent with the then existing distance between said remote object and a viewing station.

6. In a system for forming images of objects moving through space and locating said images relative to an observer, the method comprising forming images representative of portions of said objects located at progressively greater distances from a surveying station upon an image-receptive surface, moving said image-receptive surface at persistence of vision rates at progressively increasing and decreasing distances from the eye of an observer in correlation with the simultaneously existing distances between said portions of said objects and said surveying station, thereby forming before the eye of an observer a stereographic representation of said objects indicative of their relative locations and proportions.

7. In a system for producing a series of images corresponding to a plurality of objects variously located in space, the steps comprising varying the effective distance of an image-sensitive surface relative to the eye of an observer, momentarily forming images thereon seriatim, said images corresponding to objects located at progressively greater distances from a surveying station, and timing the formation of said images in such manner that the elapsed time interval between the formation of any two successive images is a function of the difference in distances of said objects from said surveying station, at corresponding moments of time.

8. In a visual position-indicating system of the type wherein images of objects are formed upon the wall of an electron tube, the combination with said electron tube of image projecting means, a screen adapted to receive projected images, and oscillating means for moving both said projecting means and said screen back and forth relative to an observation station at a rate sufficient to form persisting, composite images of said objects within the volume swept through by said screen, said images having the characteristics of delineations in perspective of said objects.

9. In a device adapted to produce images upon an electron-sensitive screen of objects variously located within the range of a viewing station, the combination with said electron-sensitive screen of image reflecting means and oscillating means for imparting a forward and backward motion to said image reflecting means relative to the eye of an observer at a rate adequate to create continuous appearing images of a three dimensional nature when viewed in said image reflecting means.

10. Three dimensional position indicating apparatus for forming images of selected objects, the positional data of which objects has been registered on a recording medium and thereafter electrically transmitted to an electron tube, comprising an electron-sensitive surface having portions thereof disposed at other than a right angular relationship to an axis of revolution, means for revolving said electron-sensitive surface about said axis of revolution at a rate correlated with the rate at which said images are formed on said recording medium.

11. In an apparatus arranged to produce three dimensional representations of remote objects of the class wherein images of said objects are formed upon an electron-sensitive surface at distances from an observer commensurate with the simultaneous distances of said remote objects from a reference station, the combination comprising a cathode ray tube having a translatable screen, and translating means for moving said screen backward and forward relative to the position of an observer at a rate to produce continuous appearing images in the region simultaneously traversed by said translatable screen and surveyed by said observer.

12. Apparatus for producing three dimensional representations of objects, comprising a cathode ray screen translatable recurrently toward and away from an observer, and electronic means for forming on said screen at successive positions thereof a representation of the portions of said objects located at distances from a reference point bearing a predetermined relation to said successive positions.

13. Apparatus for producing three dimensional representations of objects, comprising a screen translatable recurrently toward and away from an observer, means for providing range data of said respective objects, and means for forming on said screen representations of said objects in response to said data when the positions of said screen designate said respective ranges.

14. Apparatus for producing a three-dimensional representation of an object, comprising means for successively defining the respective points of intersection of portions of said object with spaced parallel planes disposed perpendicularly to a line of sight, a cathode ray screen recurrently translatable toward and away from an observer, and means responsive to said defining means for forming images of said respective points of intersection on said screen when in an instantaneous position determined by the relative position of the plane containing said points of intersection.

15. A method of stereographically depicting an object as an image on an electron-sensitive fluorescent screen oscillating recurrently toward and away from an observer, said method comprising deriving data defining the ranges to successive portions of said object, and rendering at least a portion of said screen fluorescent when the position of said screen designates said respective ranges.

16. A method of stereographically depicting an object as an image on screen oscillating recurrently toward and from an observer, said method comprising deriving data defining the orientation of portions of said object at predetermined distances relative to a point of observation, and forming an image of each portion similarly oriented on said screen in response to said data when the position of said screen designates the corresponding distance to such portion.

17. In a system for forming a three-dimensional image of an object, the steps comprising varying the effective distance between an image-forming surface and the eye of an observer, and forming on said surface images designating portions of said object when said distance corresponds with the range of said respective portions from a reference point.

18. Apparatus for forming a three-dimensional image of an object, comprising a screen, means for recurrently associating said screen with successive-depth portions of said three-dimensional image representing different effective distances between said screen and the eye of an observer, and means for successively forming on said screen representations of the corresponding portions of said object.

19. A method of stereographically depicting an object as an image on a screen movable so as to provide recurrent variation in the effective distance to an observer, said method comprising deriving data defining the distance from a reference point to successive portions of said object, and forming an image of said portions on said screen when the position of said screen relative to said observer corresponds with the distance from said reference point to said respective portions.

THOMAS M. FERRILL, Jr.